(12) United States Patent
Kawasumi

(10) Patent No.: US 8,872,483 B2
(45) Date of Patent: Oct. 28, 2014

(54) DRIVE CONTROLLING APPARATUS AND POWER GENERATION CONTROLLING METHOD

(75) Inventor: Shinji Kawasumi, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 13/981,901

(22) PCT Filed: May 29, 2012

(86) PCT No.: PCT/JP2012/063767
§ 371 (c)(1),
(2), (4) Date: Jul. 25, 2013

(87) PCT Pub. No.: WO2013/179388
PCT Pub. Date: Dec. 5, 2013

(65) Prior Publication Data
US 2013/0335040 A1 Dec. 19, 2013

(51) Int. Cl.
*H02P 9/04* (2006.01)
*H02P 9/00* (2006.01)
*H02K 29/06* (2006.01)
*H02P 6/10* (2006.01)
*B60T 7/12* (2006.01)
*G05D 1/00* (2006.01)

(52) U.S. Cl.
CPC ..................................... *H02P 9/008* (2013.01)
USPC .......................... 322/38; 318/400.23; 701/103

(58) Field of Classification Search
CPC ... H02P 9/008; H02P 6/10; F02D 2041/2027; F02D 41/20

USPC .......................... 322/38; 318/400.23; 701/103
See application file for complete search history.

(56) References Cited

U.S. PATENT DOCUMENTS 4,546,294 A * 10/1985 Ban et al. .................. 318/400.23
5,054,451 A * 10/1991 Kushi ............................ 123/478

(Continued)

FOREIGN PATENT DOCUMENTS

| JP | H07-274412 | 10/1995 |
|----|------------|---------|
| JP | 4270445 B2 | 3/2009 |
| JP | 2011-111901 | 6/2011 |
| JP | 2011-195065 | 10/2011 |

OTHER PUBLICATIONS

International Search Report for PCT/JP2012/063767, mailed on Aug. 21, 2012.

(Continued)

*Primary Examiner* — Pedro J Cuevas
(74) *Attorney, Agent, or Firm* — Ladas & Parry, LLP

(57) ABSTRACT

In a power generation controlling method, if a first peak of the inverse of the rotation number measured in a first cycle following a plurality of successive cycles is not equal to or lower than a second threshold, it is judged whether or not the first peak is equal to or higher than a third threshold, which is higher than the first threshold. Furthermore, if a second peak of the inverse of the rotation number measured in a second cycle following the first cycle is equal to or lower than a fourth threshold, a target voltage of power generation by a generator a rotating shaft of which is connected to a crank shaft of the four-stroke engine is changed from a normal state voltage to an in-acceleration voltage, which is lower than the normal state voltage.

15 Claims, 12 Drawing Sheets

(56) References Cited

U.S. PATENT DOCUMENTS

| | | | | |
|---|---|---|---|---|
| 5,850,130 | A | * | 12/1998 | Fujisaki et al. ............ 318/400.2 |
| 7,474,952 | B2 | * | 1/2009 | Sugiyama .................... 701/104 |
| 2008/0009999 | A1 | * | 1/2008 | Sugiyama .................... 701/103 |
| 2011/0074324 | A1 | * | 3/2011 | Iwaji et al. ............... 318/400.23 |
| 2013/0060455 | A1 | * | 3/2013 | Kawasumi .................... 701/113 |
| 2013/0180501 | A1 | * | 7/2013 | Kawasumi .................... 123/349 |
| 2014/0014064 | A1 | * | 1/2014 | Kawasumi .................... 123/311 |
| 2014/0067233 | A1 | * | 3/2014 | Nishida et al. ................ 701/103 |
| 2014/0103844 | A1 | * | 4/2014 | Omata et al. ............ 318/400.23 |

OTHER PUBLICATIONS

English translation of the ISR for related PCT/JP2012/063767 mailed on Aug. 21, 2012.

* cited by examiner

DRIVE CONTROLLING APPARATUS AND POWER GENERATION CONTROLLING METHOD

CROSS REFERENCE TO RELATED APPLICATION

This application is the national stage of International Patent Application no. PCT/JP2012/063767, filed on May 29, 2012, the disclosure of which is incorporated herein in its entirety.

TECHNICAL FIELD

The present invention relates to a drive controlling apparatus and a power generation controlling method.

BACKGROUND ART

There is a conventional technique of reducing a target voltage based on information on the operation of a throttle, for example, in order to reduce the load on the engine of a motorcycle during acceleration (see J270445B, for example). As the target voltage decreases, the amount of the electric power generated by a motor (generator) connected to the engine (i.e., the amount of the electricity with which a battery is charged) decreases, and therefore, the load on the engine decreases. Thus, the acceleration performance of the engine can be prevented from deteriorating.

For example, a user operates the throttle to accelerate the engine. According to the conventional technique described above, the time for the engine to accelerate is recognized based on the amount of the movement of the throttle caused by the operation, and the target voltage is changed according to the recognized time.

According to the conventional technique described above, the time to accelerate is recognized based on the amount of the movement of the throttle. Therefore, there is a problem that an additional sensor that detects the amount of the movement of the throttle is needed, and therefore the manufacturing cost of the motorcycle increases.

DISCLOSURE OF THE INVENTION

A power generation controlling method according to an embodiment being one aspect of the present invention is a power generation controlling method of controlling a generator connected to a four-stroke engine based on a result of measurement of an inverse of an rotation number of the four-stroke engine, comprising:

a first step of judging whether or not a peak of the inverse of the rotation number measured in a cycle of the four-stroke engine is equal to or lower than a first threshold and equal to or higher than a second threshold, the second threshold being lower than the first threshold;

a second step of, in a case where the peak is equal to or lower than the first threshold and equal to or higher than the second threshold, judging whether or not each of peaks of the inverses of the rotation numbers measured in a plurality of successive cycles following the cycle is equal to or lower than the first threshold and equal to or higher than the second threshold;

a third step of, in a case where it is judged in the second step that each of the peaks is equal to or lower than the first threshold and equal to or higher than the second threshold, judging whether or not a first peak of the inverse of the rotation number measured in a first cycle following the plurality of successive cycles is equal to or lower than the second threshold;

a fourth step of, in a case where the first peak is not equal to or lower than the second threshold, judging whether or not the first peak is equal to or higher than a third threshold, the third threshold being higher than the first threshold;

a fifth step of starting counting of an acceleration determination period after judging that the first peak is equal to or higher than the third threshold;

a sixth step of judging whether or not the acceleration determination period has elapsed;

a seventh step of, in a case where the acceleration determination period has not elapsed, judging whether or not a second peak of the inverse of the rotation number measured in a second cycle following the first cycle is equal to or lower than a fourth threshold, the fourth threshold being lower than the second threshold;

an eighth step of, in a case where the second peak is equal to or lower than the fourth threshold, changing a target voltage of power generation by the generator a rotating shaft of which is connected to a crank shaft of the four-stroke engine from a normal state voltage to an in-acceleration voltage, the in-acceleration voltage being lower than the normal state voltage; and a ninth step of, in a case where the second peak is equal to or lower than the fourth threshold, designating the second peak as a fifth threshold.

In the power generation controlling method, the power generation controlling method may further comprise:

a tenth step of, after changing the target voltage from the normal state voltage to the in-acceleration voltage, judging whether or not a third peak of the inverse of the rotation number measured in a third cycle following the second cycle is lower than the fifth threshold;

an eleventh step of, in a case where the third peak is not equal to or higher than the fifth threshold, judging whether or not a fourth peak of the inverse of the rotation number measured in a fourth cycle following the third cycle is equal to or lower than a sixth threshold and equal to or higher than a seventh threshold, the sixth threshold being lower than the fifth threshold, and the seventh threshold being lower than the sixth threshold;

a twelfth step of, in a case where the fourth peak is equal to or lower than the sixth threshold and equal to or higher than the seventh threshold, judging whether or not each of peaks of the inverses of the rotation numbers measured in a plurality of successive cycles following the fourth cycle is equal to or lower than the sixth threshold and equal to or higher than the seventh threshold;

a thirteenth step of starts counting of a restoration period after it is judged in the twelfth step that each of the peaks is equal to or lower than the sixth threshold and equal to or higher than the seventh threshold;

a fourteenth step of gradually changing the target voltage from the in-acceleration voltage to the normal state voltage after starting counting of the restoration period; and a fifteenth step of judging whether or not the restoration period has elapsed and stopping the change of the target voltage in a case where the restoration period has elapsed.

In the power generation controlling method, in a case where it is judged in the first step that the peak is not equal to or lower than the first threshold and equal to or higher than the second threshold, it may be judged whether or not a peak of the inverse of the rotation number measured in a next cycle is located between the first threshold and the second threshold.

In the power generation controlling method, in a case where it is judged in the second step that any of the peaks is not equal to or lower than the first threshold and equal to or higher than the second threshold, the method returns to the first step, and it may be judged whether or not a peak of the inverse of the rotation number measured in a next cycle is located between the first threshold and the second threshold.

In the power generation controlling method, in a case where it may be judged in the third step that the first peak is equal to or lower than the second threshold, the method returns to the first step, and it is judged whether or not a peak of the inverse of the rotation number measured in a next cycle is located between the first threshold and the second threshold.

In the power generation controlling method, in a case where it may be judged in the fourth step that the first peak is not equal to or higher than the third threshold, the method returns to the third step.

In the power generation controlling method, in a case where it may be judged in the sixth step that the acceleration determination period has elapsed, the method returns to the first step, and it is judged whether or not a peak of the inverse of the rotation number measured in a next cycle is located between the first threshold and the second threshold.

In the power generation controlling method, in a case where it may be judged in the seventh step that the second peak is not equal to or lower than the fourth threshold, the method returns to the sixth step, and it is judged again whether or not the acceleration determination period has elapsed.

In the power generation controlling method, in a case where it may be judged in the tenth step that the third peak is equal to or higher than the fifth threshold, the method proceeds to the thirteenth step and starts counting of the restoration period.

In the power generation controlling method, in a case where it may be judged in the eleventh step that the fourth peak is not equal to or lower than the sixth threshold and equal to or higher than the seventh threshold, the method returns to the tenth step, and it is judged whether or not a peak in a cycle following the fourth cycle is equal to or higher than the fifth threshold.

In the power generation controlling method, in a case where it may be judged in the twelfth step that each of the peaks is not equal to or lower than the sixth threshold and equal to or higher than the seventh threshold, the method returns to the tenth step, and it is judged whether or not a peak in a cycle following the plurality of successive cycles following the fourth cycle is equal to or higher than the fifth threshold.

In the power generation controlling method, in a case where it may be judged in the fifteenth step that the restoration period has not elapsed, the method returns to the fourteenth step, and the target voltage is gradually changed toward the normal state voltage.

A power generation controlling method according to an embodiment being one aspect of the present invention is a power generation controlling method of controlling a generator connected to a four-stroke engine based on a result of measurement of an inverse of an rotation number of the four-stroke engine, comprises:

a first step of judging whether or not a peak of the inverse of the rotation number measured in a cycle of the four-stroke engine is equal to or lower than a first threshold and equal to or higher than a second threshold, the second threshold being lower than the first threshold;

a second step of, in a case where the peak is equal to or lower than the first threshold and equal to or higher than the second threshold, judging whether or not each of peaks of the inverses of the rotation numbers measured in a plurality of successive cycles following the cycle is equal to or lower than the first threshold and equal to or higher than the second threshold;

a third step of, in a case where it is judged in the second step that each of the peaks is equal to or lower than the first threshold and equal to or higher than the second threshold, judging whether or not a first peak of the inverse of the rotation number measured in a first cycle following the plurality of successive cycles is equal to or lower than the second threshold;

a fourth step of, in a case where the first peak is not equal to or lower than the second threshold, judging whether or not the first peak is equal to or higher than a third threshold, the third threshold being higher than the first threshold;

a fifth step of, in a case where the first peak is equal to or higher than the third threshold, changing a target voltage of power generation by a motor a rotating shaft of which is connected to a crank shaft of the four-stroke engine from a normal state voltage to an in-acceleration voltage, the in-acceleration voltage being lower than the normal state voltage.

In the power generation controlling method, the power generation controlling method may further comprise:

a sixth step of starting counting of an acceleration determination period after changing the target voltage from the normal state voltage to the in-acceleration voltage;

a seventh step of judging whether or not a second peak of the inverse of the rotation number measured in a second cycle following the first cycle is equal to or higher than the third threshold;

an eighth step of, in a case where the second peak is equal to or higher than the third threshold, judging whether or not the acceleration determination period has elapsed; and a ninth step of, in a case where it is judged in the eighth step that the acceleration determination period has elapsed, changing the target voltage from the in-acceleration voltage to the normal state voltage.

In the power generation controlling method, in a case where it may be judged in the eighth step that the acceleration determination period has not elapsed, the method returns to the seventh step, and it is judged whether or not the second peak of the inverse of the rotation number measured in a next cycle is equal to or higher than the third threshold.

In the power generation controlling method, the power generation controlling method may further comprise:

a tenth step of, in a case where it is judged in the seventh step that the second peak is not equal to or higher than the third threshold, judging whether or not the second peak is equal to or lower than the fourth threshold.

In the power generation controlling method, in a case where it may be judged in the tenth step that the second peak is not equal to or lower than the fourth threshold, the method returns to the seventh step, and it is judged whether or not a third peak of the inverse of the rotation number measured in a third cycle following the second cycle is equal to or higher than the third threshold.

In the power generation controlling method, the peak of the inverse of the rotation number is measured in a compression stroke of a cycle of the four-stroke engine.

A drive controlling apparatus according to an embodiment being one aspect of the invention is a drive controlling apparatus that controls driving of a four-stroke engine, performs:

a first step of judging whether or not a peak of an inverse of an rotation number measured in a cycle of the four-stroke engine is equal to or lower than a first threshold and equal to or higher than a second threshold, the second threshold being lower than the first threshold;

a second step of, in a case where the peak is equal to or lower than the first threshold and equal to or higher than the second threshold, judging whether or not each of peaks of the inverses of the rotation numbers measured in a plurality of successive cycles following the cycle is equal to or lower than the first threshold and equal to or higher than the second threshold;

a third step of, in a case where it is judged in the second step that each of the peaks is equal to or lower than the first threshold and equal to or higher than the second threshold, judging whether or not a first peak of the inverse of the rotation number measured in a first cycle following the plurality of successive cycles is equal to or lower than the second threshold;

a fourth step of, in a case where the first peak is not equal to or lower than the second threshold, judging whether or not the first peak is equal to or higher than a third threshold, the third threshold being higher than the first threshold;

a fifth step of starting counting of an acceleration determination period after judging that the first peak is equal to or higher than the third threshold;

a sixth step of judging whether or not the acceleration determination period has elapsed;

a seventh step of, in a case where the acceleration determination period has not elapsed, judging whether or not a second peak of the inverse of the rotation number measured in a second cycle following the first cycle is equal to or lower than a fourth threshold, the fourth threshold being lower than the second threshold;

an eighth step of, in a case where the second peak is equal to or lower than the fourth threshold, changing a target voltage of power generation by the generator a rotating shaft of which is connected to a crank shaft of the four-stroke engine from a normal state voltage to an in-acceleration voltage, the in-acceleration voltage being lower than the normal state voltage; and a ninth step of, in a case where the second peak is equal to or lower than the fourth threshold, designating the second peak as a fifth threshold.

In the drive controlling apparatus, the drive controlling apparatus may further perform:

a tenth step of, after changing the target voltage from the normal state voltage to the in-acceleration voltage, judging whether or not a third peak of the inverse of the rotation number measured in a third cycle following the second cycle is lower than the fifth threshold;

an eleventh step of, in a case where the third peak is not equal to or higher than the fifth threshold, judging whether or not a fourth peak of the inverse of the rotation number measured in a fourth cycle following the third cycle is equal to or lower than a sixth threshold and equal to or higher than a seventh threshold, the sixth threshold being lower than the fifth threshold, and the seventh threshold being lower than the sixth threshold;

a twelfth step of, in a case where the fourth peak is equal to or lower than the sixth threshold and equal to or higher than the seventh threshold, judging whether or not each of peaks of the inverses of the rotation numbers measured in a plurality of successive cycles following the fourth cycle is equal to or lower than the sixth threshold and equal to or higher than the seventh threshold;

a thirteenth step of starts counting of a restoration period after it is judged in the twelfth step that each of the peaks is equal to or lower than the sixth threshold and equal to or higher than the seventh threshold;

a fourteenth step of gradually changing the target voltage from the in-acceleration voltage to the normal state voltage after starting counting of the restoration period; and a fifteenth step of judging whether or not the restoration period has elapsed and stopping the change of the target voltage in a case where the restoration period has elapsed.

In the drive controlling apparatus, the drive controlling apparatus can modify the first threshold and the second threshold.

In the drive controlling apparatus, the drive controlling apparatus can modify the sixth threshold and the seventh threshold.

A power generation controlling method according to an aspect of the present invention takes advantage of the phenomenon that, when the operation of a four-stroke engine changes to an acceleration state, the amount of the intake air of the four-stroke engine changes, and the rotation number decreases immediately before the acceleration starts.

Specifically, it is judged whether or not each of the peaks of the inverses of the rotation numbers measured in a plurality of successive cycles of the four-stroke engine is equal to or lower than a first threshold and equal to or higher than a second threshold. If a first peak of the inverse of the rotation number measured in a first cycle following the plurality of successive cycles described above is not equal to or lower than the second threshold, it is judged whether or not the first peak is equal to or higher than a third threshold, which is higher than the first threshold.

In this way, it is possible to detect a decrease of the rotation number of the engine caused by an increase of the amount of the intake air of the four-stroke engine in acceleration.

Furthermore, if a second peak of the inverse of the rotation number measured in a second cycle following the first cycle is equal to or lower than a fourth threshold, a target voltage of power generation by a generator a rotating shaft of which is connected to a crank shaft of the four-stroke engine is changed from a normal state voltage to an in-acceleration voltage, which is lower than the normal state voltage.

In this way, it is possible to change the target voltage by judging the acceleration state based on information on the rotation number of the four-stroke engine without using information on the operation of a throttle.

That is, the power generation controlling method according to this aspect of the present invention can reduce the manufacturing cost of a motorcycle.

BEST MODE FOR CARRYING OUT THE INVENTION

In the following, embodiments of the present invention will be described with reference to the drawings.

Embodiment 1

Figure 1:
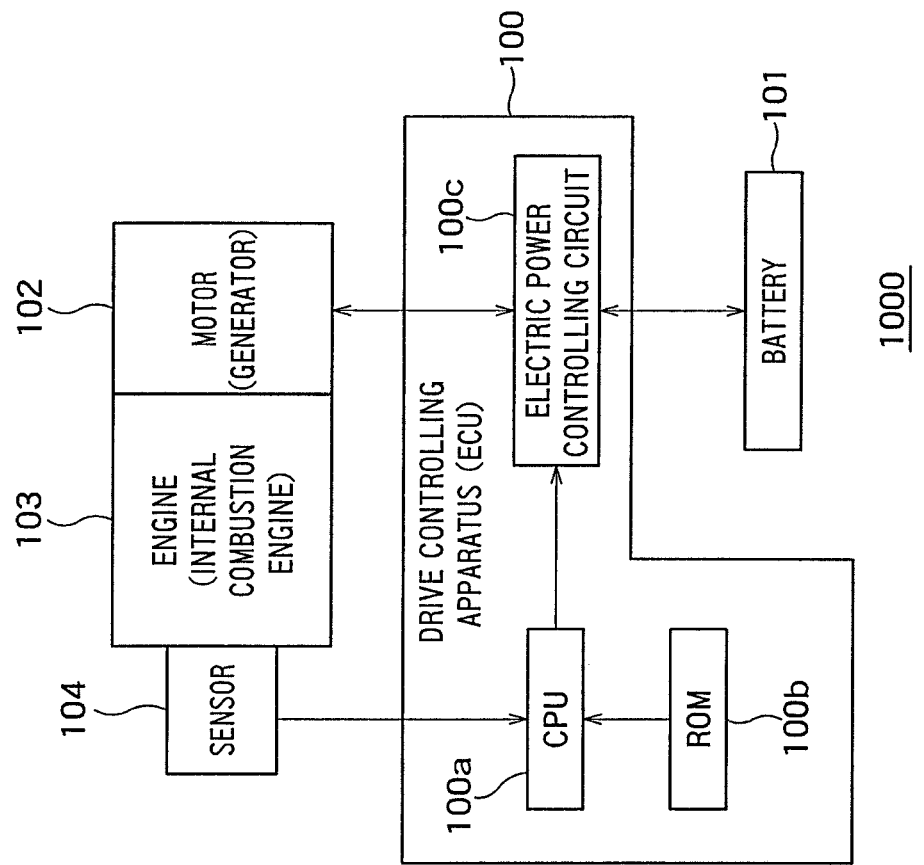
FIG. 1 is a diagram showing an example of a configuration of a drive controlling system 1000 according to an embodiment 1, which is an aspect of the present invention.
Figure 2:
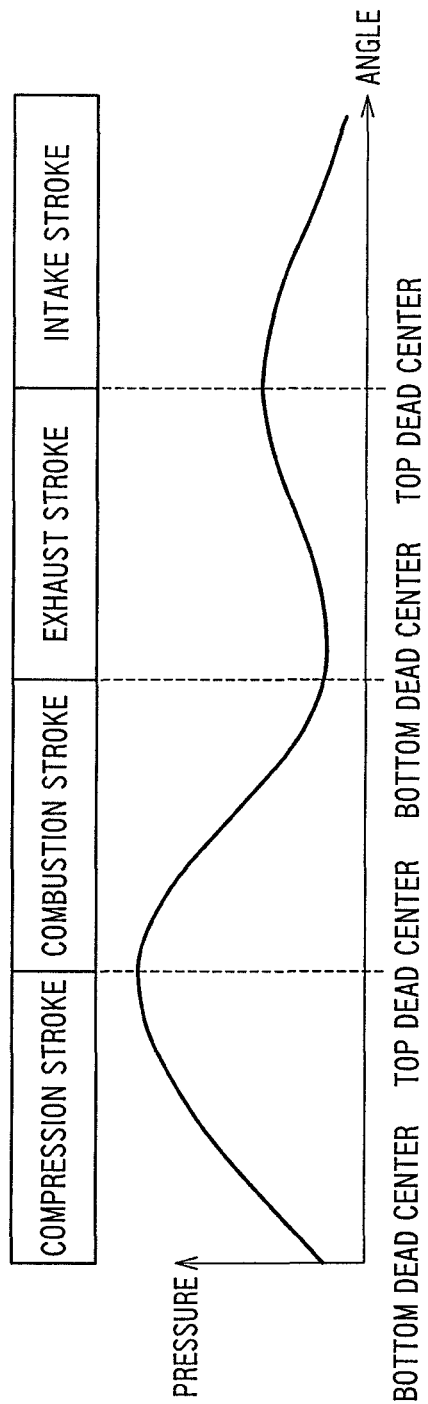
FIG. 2 is a diagram showing an example of a relationship between each stroke (a crank angle) in one cycle of an engine 103 of the drive controlling system 1000 shown in FIG. 1 and the pressure in a cylinder.

FIG. 1 is a diagram showing an example of a configuration of a drive controlling system 1000 according to an embodiment 1, which is an aspect of the present invention. FIG. 2 is a diagram showing an example of a relationship between each stroke (a crank angle) in one cycle of an engine 103 of the drive controlling system 1000 shown in FIG. 1 and the pressure in a cylinder.

As shown in FIG. 1, the drive controlling system 1000 that controls driving of the engine includes a drive controlling apparatus (an engine control unit (ECU)) 100, a battery 101, a motor 102, an engine (an internal combustion engine) 103 and a sensor 104.

The engine 103 is a four-stroke engine (sometimes expressed as a four-stroke engine 103 as required hereinafter). Therefore, as shown in FIG. 2, the state of the engine 103 transitions through an intake stroke, a compression stroke, a combustion stroke and an exhaust stroke. In addition, as shown in FIG. 2, the pressure in the cylinder of the engine 103 (that is, the resistance to the rotation of the crank) reaches a maximum at a top dead center.

The motor 102 is configured to apply a torque to a crank shaft of the engine 103. In this example, the motor 102 is coupled to the crank shaft of the engine 103 in such a manner that the motor 102 can apply a torque to and receive a torque from the crank shaft. That is, the motor 102 is connected to the engine 103 and functions as both a electric motor and a generator (the motor 102 will be sometimes expressed as a generator 102 as required hereinafter).

The sensor 104 is configured to detect the rotation number and the crank angle of the engine 103 and output a detection signal responsive to the result of the detection.

The battery 101 is configured to supply a driving electric power to the motor 102 or be charged with an electric power regenerated by the motor 102.

The drive controlling apparatus 100 is configured to control driving of the engine 103 by judging the state of the engine 103 based on the detection signal (that is, the rotation number and the crank angle of the engine 103 obtained from the detection signal). In particular, if there is a restart request for the engine 103, the drive controlling apparatus 100 drives the motor 102 to control the operation of the engine 103.

The drive controlling apparatus 100 has a central processing unit (CPU) 100a, a read only memory (ROM) 100b and an electric power controlling circuit 100c, for example.

The electric power controlling circuit 100c is configured to control the operation of the motor 102 that applies a torque to the engine 103.

The ROM 100b is configured to store a map for controlling start or other operation of the engine 103 (i.e., for controlling the motor 102).

The CPU 100a is configured to refer to the ROM 100c and control the electric power controlling circuit 100c to control the motor 102 based on the rotation number and the crank angle of the engine 103 detected by the sensor 101.

Figure 3:
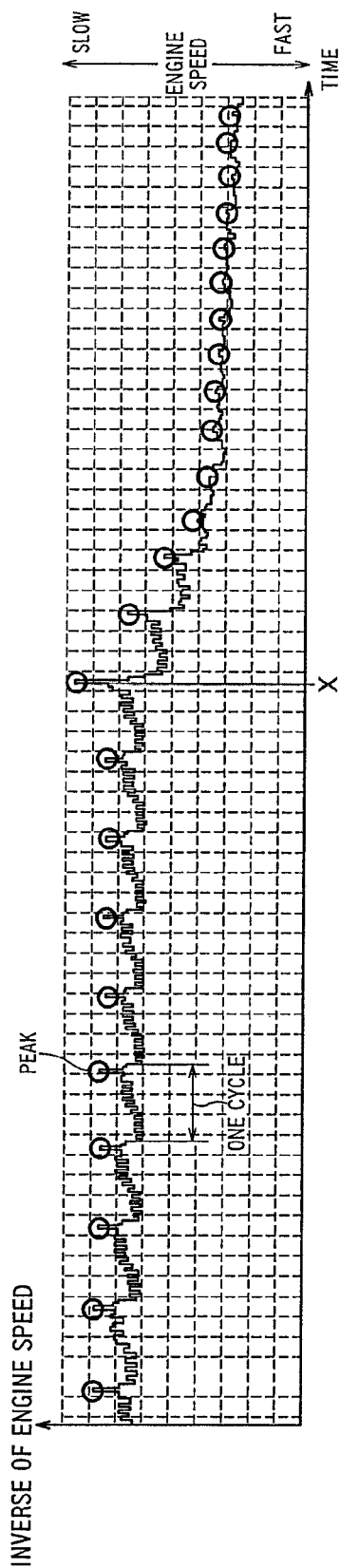
FIG. 3 is a diagram showing an example of a relationship between the inverse of the rotation number of the four-stroke engine 103 and time.

FIG. 3 is a diagram showing an example of a relationship between the inverse of the rotation number of the four-stroke engine 103 and time. The inverse of the rotation number of the four-stroke engine 103 is the duration of each stroke of the four-stroke engine 103, for example, the time between adjacent angles detected by an angle sensor including a Hall IC.

As shown in FIG. 3, a peak of the inverse of the rotation number appears in the compression stroke of each cycle (shown by a circle in FIG. 3).

In particular, the peak of the inverse of the rotation number that appears in the vicinity of a time "X" in FIG. 3 is higher than the other peaks. In the vicinity of the time "X," an operation to open the throttle occurs. If the operation to open the throttle occurs, the amount of the air flowing into the engine cylinder increases, and the pressure in compression increases. That is, in the vicinity of the time "X" in which the throttle is opened, the operation of the four-stroke engine changes into an acceleration state, and the amount of the intake air of the four-stroke engine changes. As a result, the rotation number decreases (the peak of the inverse of the rotation number becomes higher than a predetermined value) immediately before the acceleration starts.

The time at which the peak of the inverse of the rotation number becomes higher than the predetermined value is judged as a state where the user opens the throttle to achieve acceleration. Based on the judgment, the time to reduce the load on the engine is set. In this way, the acceleration state can be judged and the target voltage can be changed based on the information on the rotation number of the four-stroke engine without using the information on the operation of the throttle.

It is to be noted that the drive controlling apparatus 100 measures the peak of the inverse of the rotation number in the compression stroke of a cycle of the four-stroke engine 103. That is, the peak of the inverse of the rotation number corresponds to the vicinity of the top dead center of the compression stroke.

Next, provided the phenomenon described above, an example of a power generation controlling method performed by the drive controlling apparatus 100 of the drive controlling system 1000 configured as described above will be described. The power generation controlling method performed by the drive controlling apparatus 100 is to control the generator 102 connected to the four-stroke engine 103 based on the result of the measurement of the inverse of the rotation number of the four-stroke engine 103.

Figure 4:
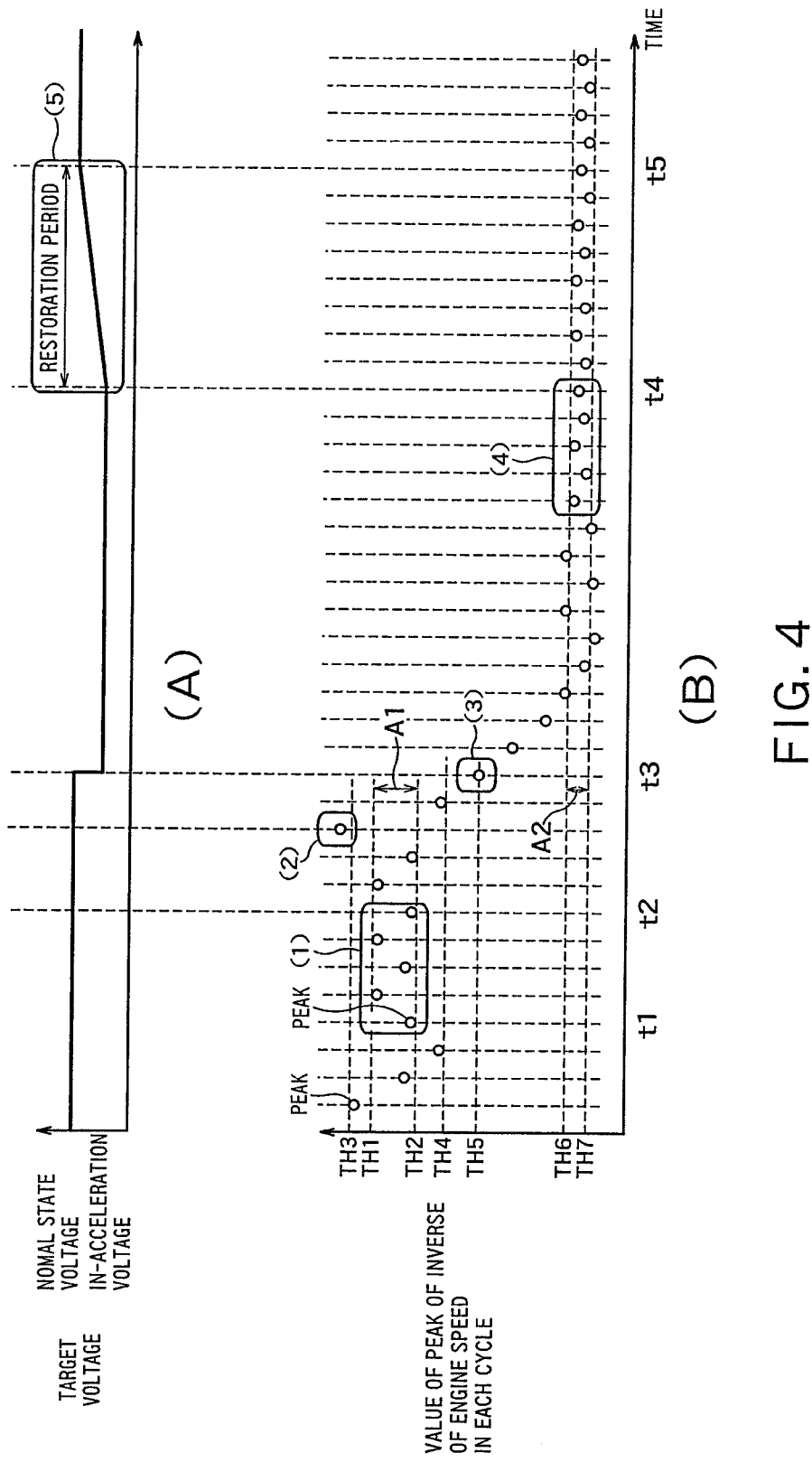
FIG. 4(A) is a diagram showing an example of a variation of the target voltage.
FIG. 4(B) is a diagram showing an example of a variation of the peak value in each cycle.
Figure 5:
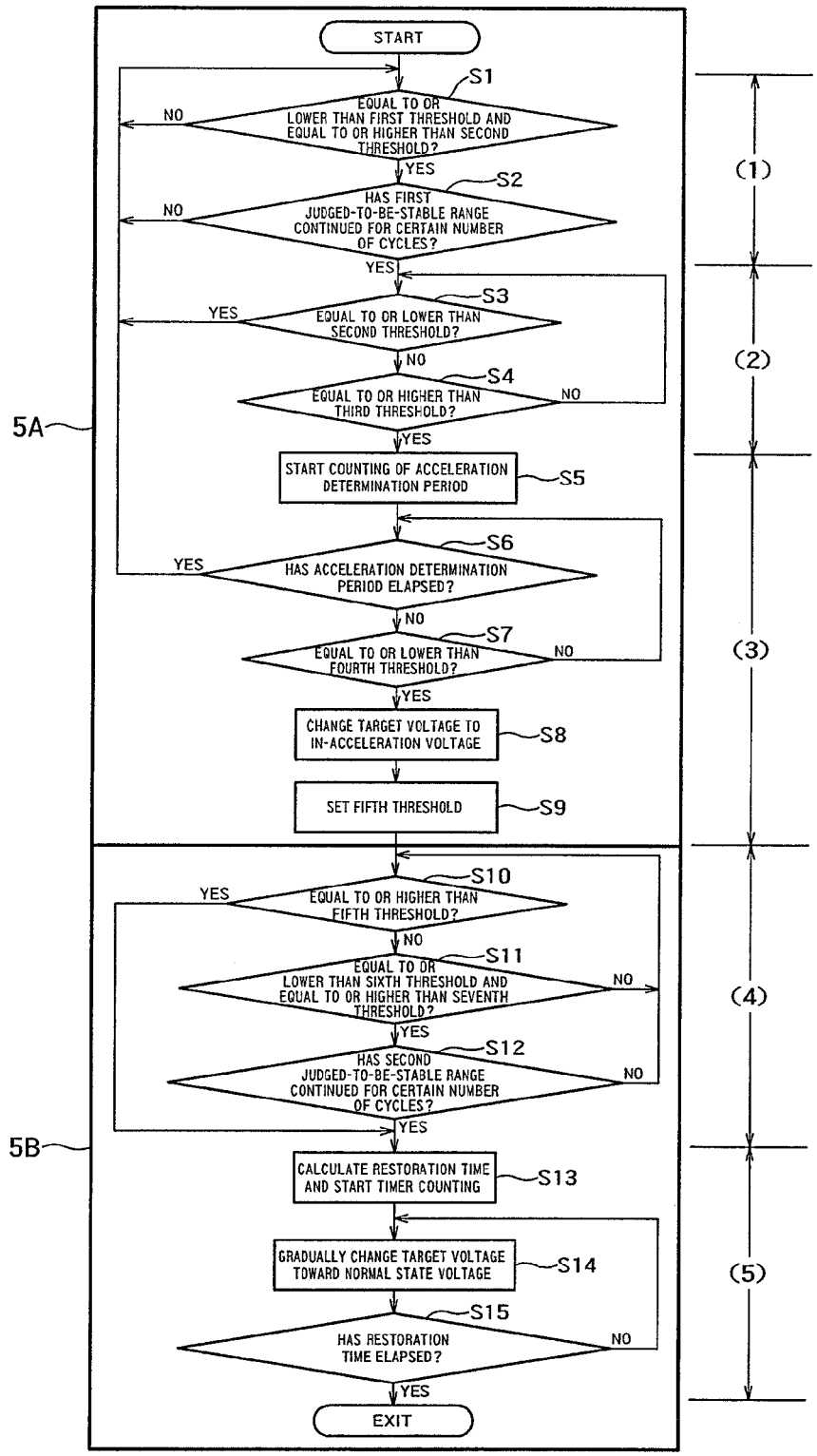
FIG. 5 is a flowchart showing an example of the power generation controlling method according to the embodiment 1 performed by the drive controlling apparatus 100 shown in FIG. 1.
Figure 5A:
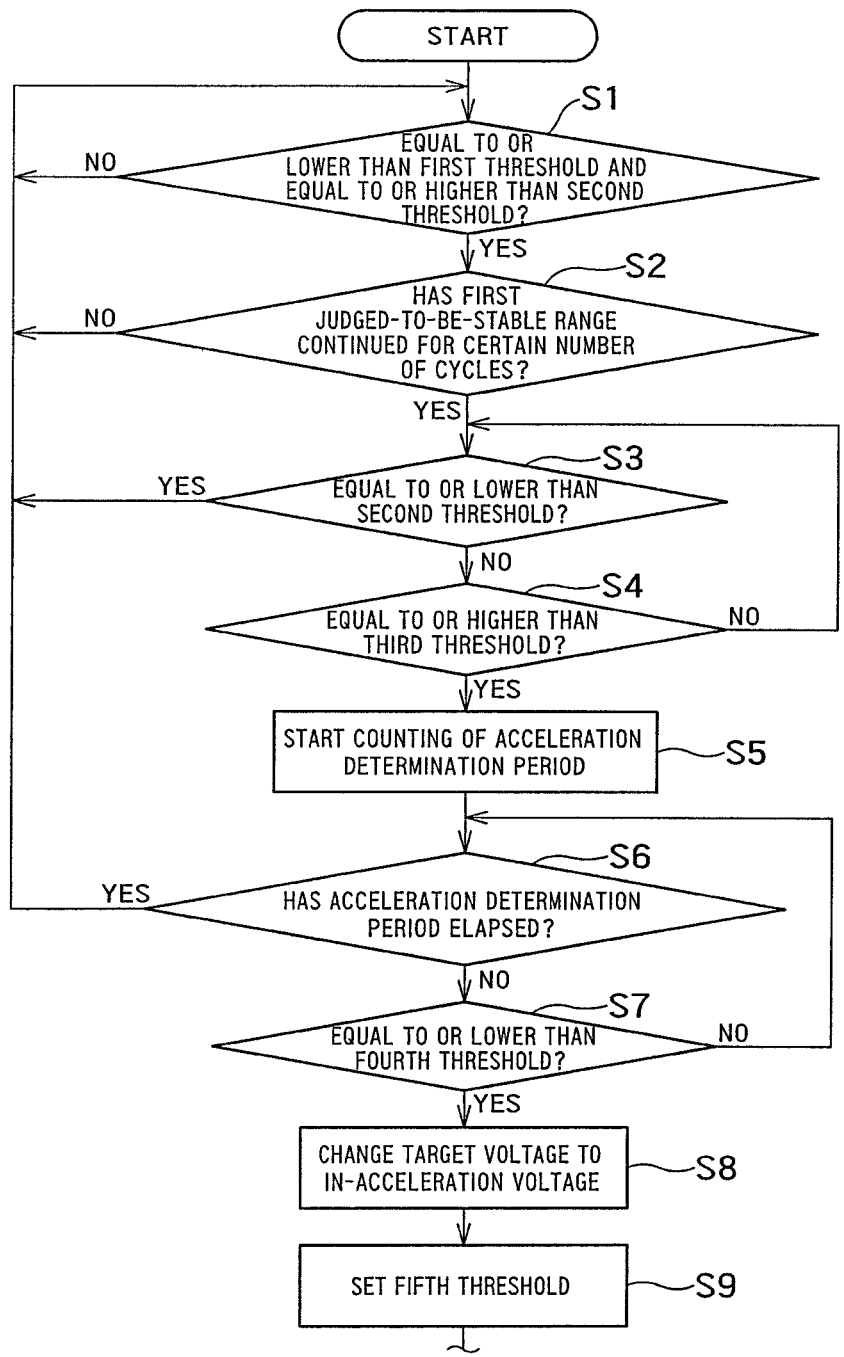
Figure 5B:
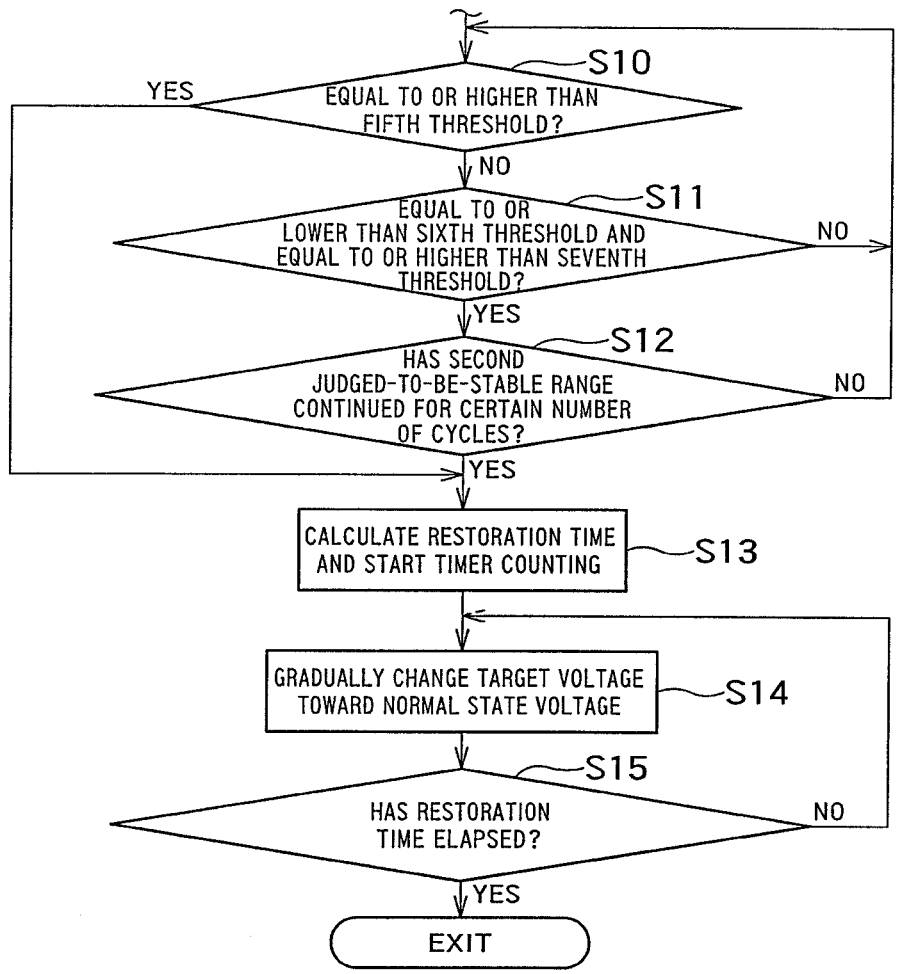

FIG. 4(A) is a diagram showing an example of a variation of the target voltage. FIG. 4(B) is a diagram showing an example of a variation of the peak value in each cycle. In FIG. 4(B), open circles are plots of the value of the peak of the inverse of the rotation number. FIG. 5 is a flowchart showing an example of the power generation controlling method according to the embodiment 1 performed by the drive controlling apparatus 100 shown in FIG. 1. A stroke (1) in FIG. 4 corresponds to a first step S1 and a second step S2 in FIG. 5. A stroke (2) in FIG. 4 corresponds to a third step S3 and a fourth step S4 in FIG. 5. A stroke (3) in FIG. 4 corresponds to a fifth step S5, a sixth step S6, a seventh step S7, an eighth step S8 and a ninth step S9 in FIG. 5. A stroke (4) in FIG. 4 corresponds to a tenth step S10, an eleventh step S11 and a twelfth step S12 in FIG. 5. A stroke (5) in FIG. 4 corresponds to a thirteenth step S13, a fourteenth step S14 and a fifteenth step S15 in FIG. 5.

As shown in FIG. 5, first, the drive controlling apparatus 100 judges whether or not the peak of the inverse of the rotation number measured in one cycle of the four-stroke engine 103 is equal to or lower than a first threshold Th1 and equal to or greater than a second threshold Th2, which is lower than the first threshold TH1 (the first step S1).

In other words, the drive controlling apparatus 100 determines whether or not the peak falls within a first judged-to-be-stable range A1.

If the drive controlling apparatus 100 judges in the first step S1 that the peak is not equal to or lower than the first threshold TH1 and equal to or higher than the second threshold TH2, the drive controlling apparatus 100 judges that the rotation of the engine 103 does not fall within the stable range (the first judged-to-be-stable range A1), and judges whether or not the peak of the inverse of the rotation number measured in the next cycle is located between the first threshold TH1 and the second threshold TH2

On the other hand, if the peak is equal to or lower than the first threshold TH1 and equal to or higher than the second threshold TH2, the drive controlling apparatus 100 judges whether or not the peak of the inverse of the rotation number measured in each of the cycle and a plurality of successive cycles following the cycle is equal to or lower than the first threshold TH1 and equal to or higher than the second threshold TH2 (the second step S2).

That is, the drive controlling apparatus 100 judges whether or not each of the peaks falls within the first judged-to-be-stable range A1. If the state where the throttle is closed continues, the rotation number of the engine 103 is stable at an idling rotation number.

If the drive controlling apparatus 100 judges in the second step S2 that any of the peaks is not equal to or lower than the first threshold TH1 and equal to or higher than the second threshold TH2, the drive controlling apparatus 100 judges that the rotation of the four-stroke engine 103 does not continuously fall within the stable range and returns to the first step S1, in which the drive controlling apparatus 100 judges whether or not the peak of the inverse of the rotation number measured in the next cycle is located between the first threshold TH1 and the second threshold TH2.

On the other hand, if the drive controlling apparatus 100 judges in the second step S2 that each peak is equal to or lower than the first threshold TH1 and equal to or higher than the second threshold TH2, the drive controlling apparatus 100 judges whether or not a first peak of the inverse of the rotation number measured in a first cycle following the plurality of successive cycles is equal to or lower than the second threshold TH2 (the third step S3).

On the other hand, if the drive controlling apparatus 100 judges in the third step S3 that the first peak is equal to or lower than the second threshold TH2, the drive controlling apparatus 100 judges that the amount of the intake air in the intake stroke of the first cycle is low and returns to the first step S1, in which the drive controlling apparatus 100 judges whether or not the peak of the inverse of the rotation number measured in the next cycle is located between the first threshold TH1 and the second threshold TH2.

If the first peak is not equal to or lower than the second threshold TH2, the drive controlling apparatus 100 judges whether or not the first peak is equal to or higher than a third threshold TH3, which is higher than the first threshold TH1 (the fourth step S4).

If the drive controlling apparatus 100 judges in the fourth step S4 that the first peak is not equal to or higher than the third threshold TH3, the drive controlling apparatus 100 judges that the rotation of the four-stroke engine 103 is stable and returns to the third step S3.

On the other hand, when the drive controlling apparatus 100 judges that the first peak is equal to or higher than the third threshold TH3, the drive controlling apparatus 100 starts counting of an acceleration determination period (the fifth step S5). That is, the drive controlling apparatus 100 judges that the amount of the intake air in the intake stroke is large and acceleration is yet to start, and starts counting of the acceleration determination period.

Then, the drive controlling apparatus 100 judges whether or not the acceleration determination period has elapsed (the sixth step S6).

If the drive controlling apparatus 100 judges in the sixth step S6 that the acceleration determination period has elapsed, the drive controlling apparatus 100 returns to the first step S1, in which the drive controlling apparatus 100 judges whether or not the peak of the inverse of the rotation number measured in the next cycle is located between the first threshold TH1 and the second threshold TH2.

On the other hand, if the acceleration determination period has not elapsed (that is, during the acceleration determination period), the drive controlling apparatus 100 judges whether or not a second peak of the inverse of the rotation number measured in a second cycle following the first cycle is equal to or lower than a fourth threshold TH4, which is lower than the second threshold TH2 (the seventh step S7).

If the drive controlling apparatus 100 judges in the seventh step S7 that the second peak is not equal to or lower than the fourth threshold TH4 (that is, no acceleration is occurring), the drive controlling apparatus 100 returns to the sixth step S6, in which the drive controlling apparatus 100 judges again whether or not the acceleration determination period has elapsed.

On the other hand, if the second peak is equal to or lower than the fourth threshold TH4 (acceleration is occurring), the drive controlling apparatus 100 changes the target voltage of the power generation by the generator 102 a rotating shaft of which is connected to the crank shaft of the four-stroke engine 103 from a normal state voltage to an in-acceleration voltage, which is lower than the normal state voltage (the eighth step S8).

Furthermore, if the second peak is equal to or lower than the fourth threshold TH4, the drive controlling apparatus 100 designates the second peak as a fifth threshold TH5 (the ninth step S9).

It is to be noted that, in the case where the target voltage is to be reduced in this way, the engine 103 is controlled to output power. Thus, the load on the engine 103 is desirably abruptly lightened, and therefore, the target voltage can be instantaneously changed from the normal state voltage to the in-acceleration voltage.

Then, after changing the target voltage from the normal state voltage to the in-acceleration voltage, the drive controlling apparatus 100 judges whether or not a third peak of the inverse of the rotation number measured in a third cycle following the second cycle is lower than the fifth threshold TH5 (the tenth step S10).

Then, if the third peak is not equal to or higher than the fifth threshold TH5 (that is, acceleration is occurring), the drive controlling apparatus 100 judges whether or not a fourth peak of the inverse of the rotation number measured in a fourth cycle following the third cycle is equal to or lower than a sixth threshold TH6, which is lower than the fifth threshold TH5, and equal to or higher than a seventh threshold TH7, which is lower than the sixth threshold TH6 (that is, whether the fourth peak falls within a second judged-to-be-stable range A2) (the eleventh step S11).

If the drive controlling apparatus 100 judges in the eleventh step S11 that the fourth peak is not equal to or lower than the sixth threshold TH6 and equal to or higher than the seventh threshold TH7, the drive controlling apparatus 100 returns to the tenth step S10, in which the drive controlling apparatus 100 judges whether or not the peak in a cycle following the fourth cycle (the next cycle following the fourth cycle, for example) is equal to or higher than the fifth threshold TH5. In this case, the peak in that following cycle is treated as the third peak described above.

On the other hand, if the fourth peak is equal to or lower than the sixth threshold TH6 and equal to or higher than the seventh threshold TH7, the drive controlling apparatus 100 judges whether or not each of the peaks of the inverses of the rotation numbers measured in a plurality of successive cycles following the fourth cycle is equal to or lower than the sixth threshold TH7 and equal to or higher than the seventh threshold TH7 (that is, whether the peak falls within the second judged-to-be-stable range A2) (the twelfth step S12).

If the drive controlling apparatus 100 judges in the twelfth step S12 that each peak is not equal to or lower than the sixth threshold TH6 and equal to or higher than the seventh threshold TH7, the drive controlling apparatus 100 returns to the tenth step S10, in which the drive controlling apparatus 100 judges whether or not the peak in a cycle following the plurality of successive cycles following the fourth cycle (the next cycle following the plurality of cycles, for example) is equal to or higher than the fifth threshold TH5. In this case, the peak in that following cycle is treated as the third peak described above.

When the drive controlling apparatus 100 judges in the twelfth step S12 that each peak is equal to or lower than the sixth threshold TH6 and equal to or higher than the seventh threshold TH7, the drive controlling apparatus 100 starts counting of a restoration period (the thirteenth step S13).

It is to be noted that, if the drive controlling apparatus 100 judges in the tenth step S10 described above that the third peak is equal to or higher than the fifth threshold TH5, the drive controlling apparatus 100 proceeds to the thirteenth step S13, in which the drive controlling apparatus 100 starts counting of the restoration period.

After starting counting of the restoration period in the thirteenth step S13, the drive controlling apparatus 100 gradually changes the target voltage from the in-acceleration voltage to the normal state voltage (the fourteenth step S14).

Then, the drive controlling apparatus 100 judges whether or not the restoration period has elapsed. If the restoration period has elapsed, the drive controlling apparatus 100 stops the change of the target voltage (the fifteenth step S15).

On the other hand, if the drive controlling apparatus 100 judges in the fifteenth step S15 that the restoration period has not elapsed, the drive controlling apparatus 100 returns to the fourteenth step S14, in which the drive controlling apparatus 100 gradually changes the target voltage toward the normal state voltage.

In the case where the target voltage is to be increased in this way, the engine 103 is trying to make the rotation number stable. Thus, if the load on the engine 103 abruptly increases, the rotation number may drop. Therefore, the target voltage is gradually restored to the normal state voltage, and upon completion of the restoration, the drive controlling apparatus 100 waits for the rotation number to be stable and performs monitoring again.

Through the steps described above, the operation of judging the acceleration state and changing the target voltage based on the information on the rotation number of the four-stroke engine without using the information on the operation of the throttle is completed.

As described above, the power generation controlling method according to the embodiment 1 takes advantage of the phenomenon that, when the operation of the four-stroke engine changes to the acceleration state, the amount of the intake air of the four-stroke engine changes, and the rotation number decreases immediately before the acceleration starts.

Specifically, it is judged whether or not each of the peaks of the inverses of the rotation numbers measured in a plurality of successive cycles of the four-stroke engine is equal to or lower than the first threshold and equal to or higher than the second threshold. If the first peak of the inverse of the rotation number measured in the first cycle following the plurality of successive cycles is not equal to or lower than the second threshold, it is judged whether or not the first peak is equal to or higher than the third threshold, which is higher than the first threshold.

In this way, it is possible to detect a decrease of the rotation number of the engine caused by an increase of the amount of the intake air of the four-stroke engine in acceleration.

Furthermore, if the second peak of the inverse of the rotation number measured in the second cycle following the first cycle is equal to or lower than the fourth threshold, the target voltage of the power generation by the generator, the rotating shaft of which is connected to the crank shaft of the four-stroke engine, is changed from the normal state voltage to the in-acceleration voltage, which is lower than the normal state voltage.

In this way, it is possible to change the target voltage by judging the acceleration state based on the information on the rotation number of the four-stroke engine without using the information on the operation of the throttle.

As described above, the power generation controlling method according to this embodiment can reduce the manufacturing cost of a motorcycle.

Embodiment 2

In the embodiment 1, an example of the power generation controlling method has been described.

In an embodiment 2, another example of the power generation controlling method will be described. It is to be noted that the power generation controlling method according to the embodiment 2 is performed by the drive controlling apparatus 100 of the drive controlling system 1000 shown in FIG. 1, as with the power generation controlling method according to the embodiment 1.

Figure 6:
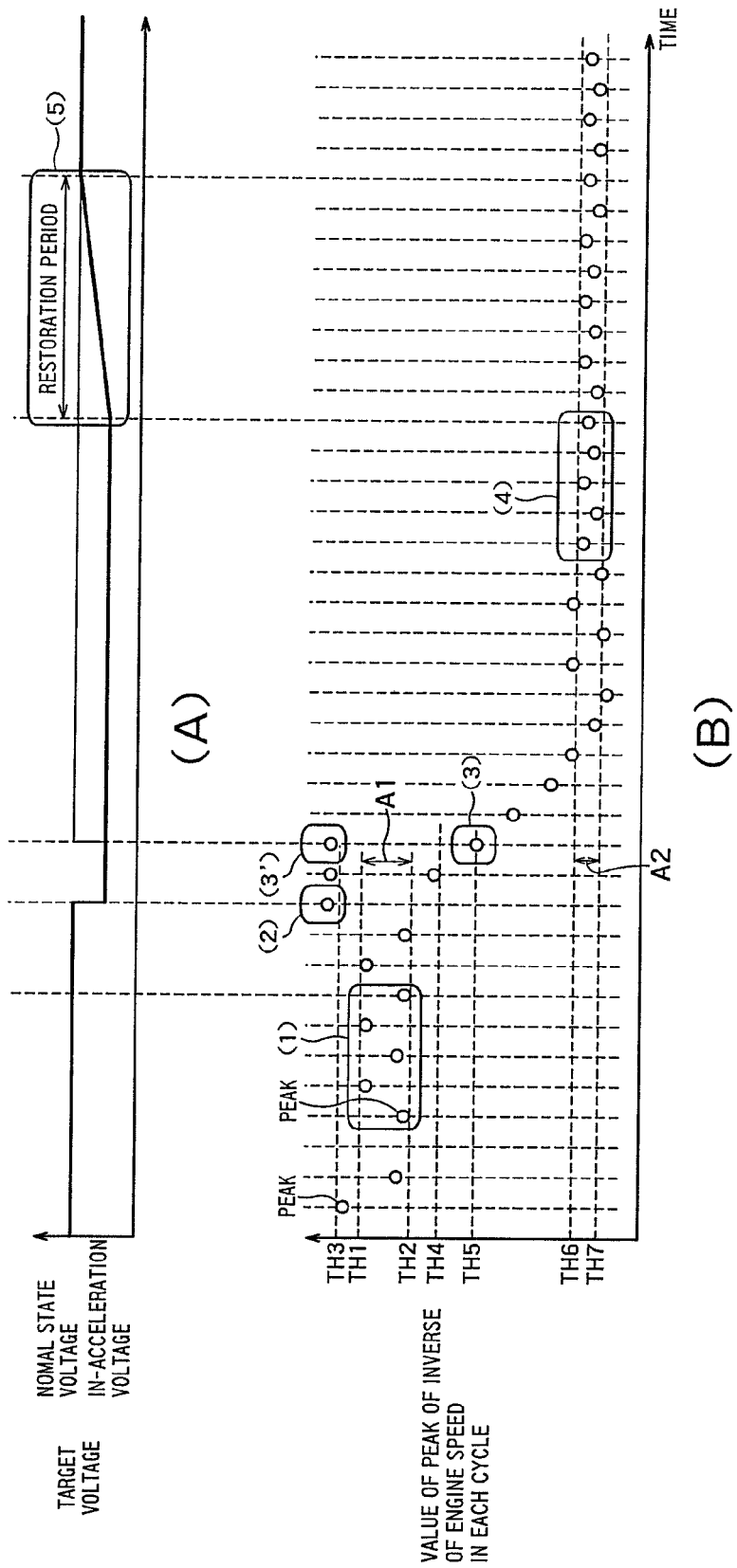
FIG. 6(A) is a diagram showing an example of a variation of the target voltage.
FIG. 6(B) is a diagram showing an example of a variation of the peak value in each cycle.
Figure 7:
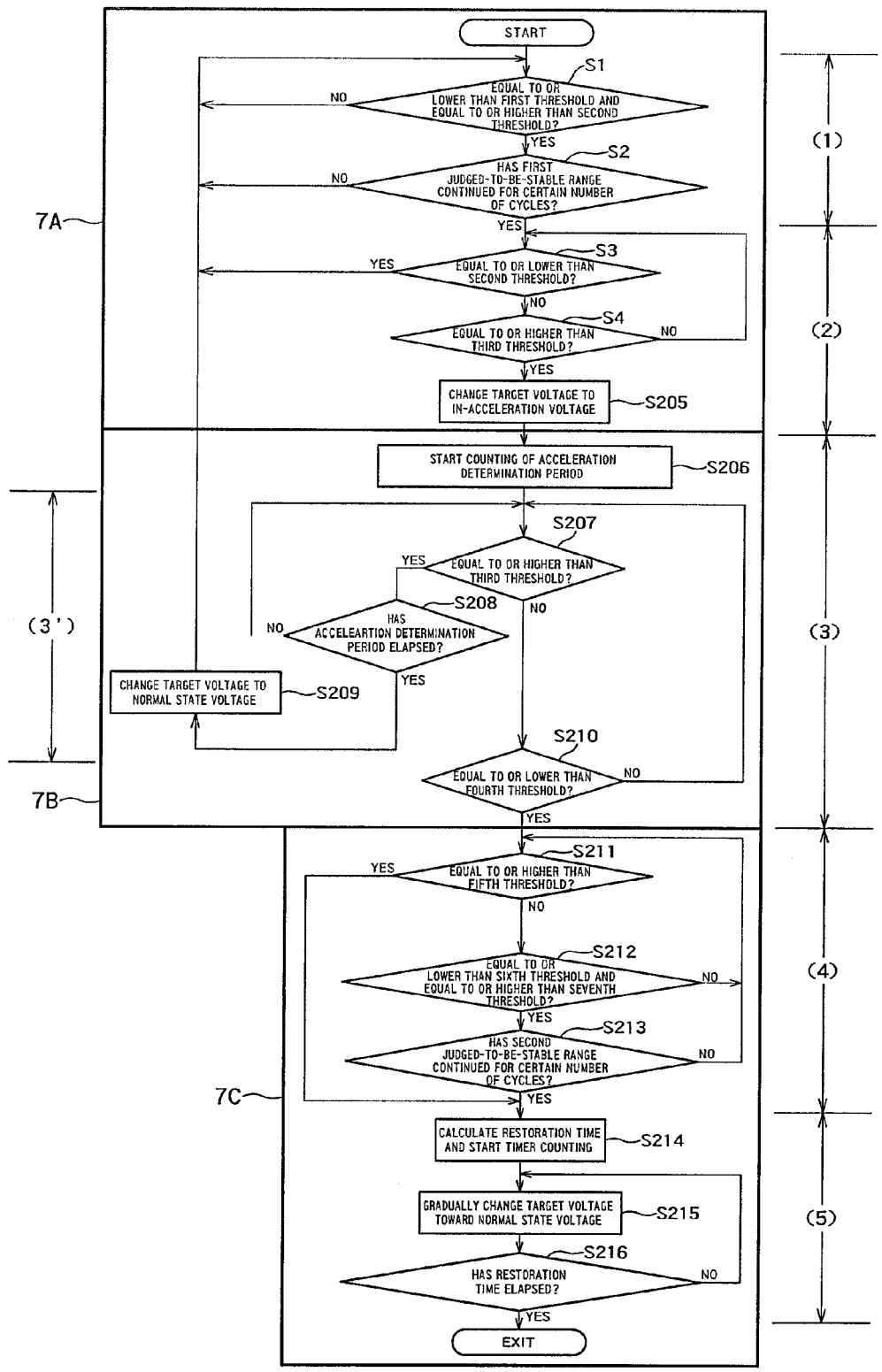
FIG. 7 is a flowchart showing an example of the power generation controlling method according to the embodiment 2 performed by the drive controlling apparatus 100 shown in FIG. 1.
Figure 7A:
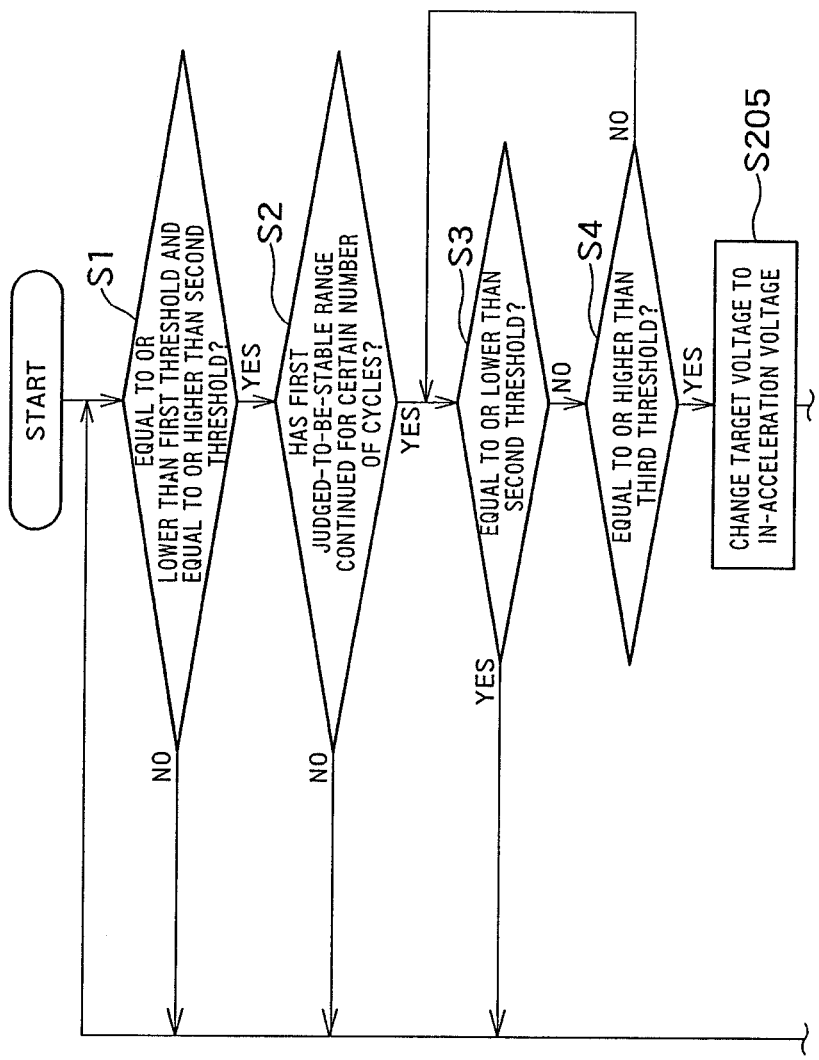
Figure 7B:
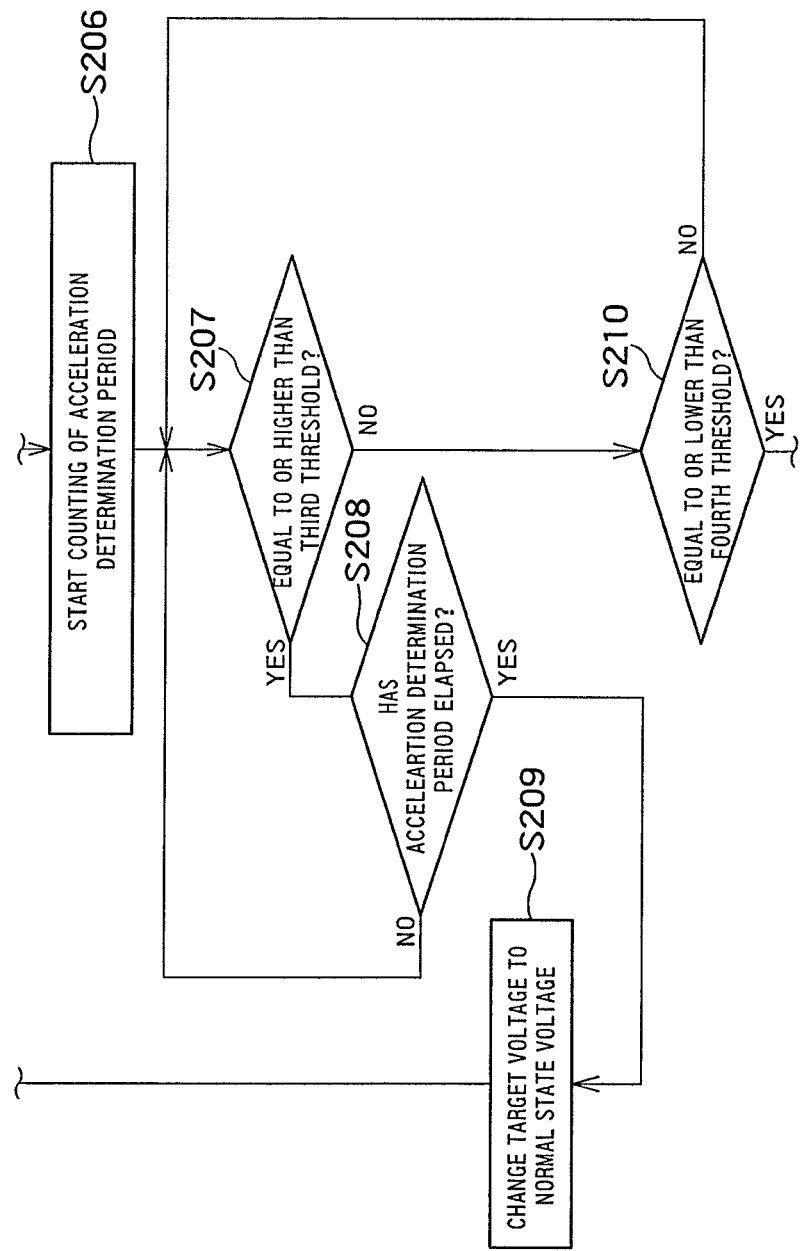
Figure 7C:
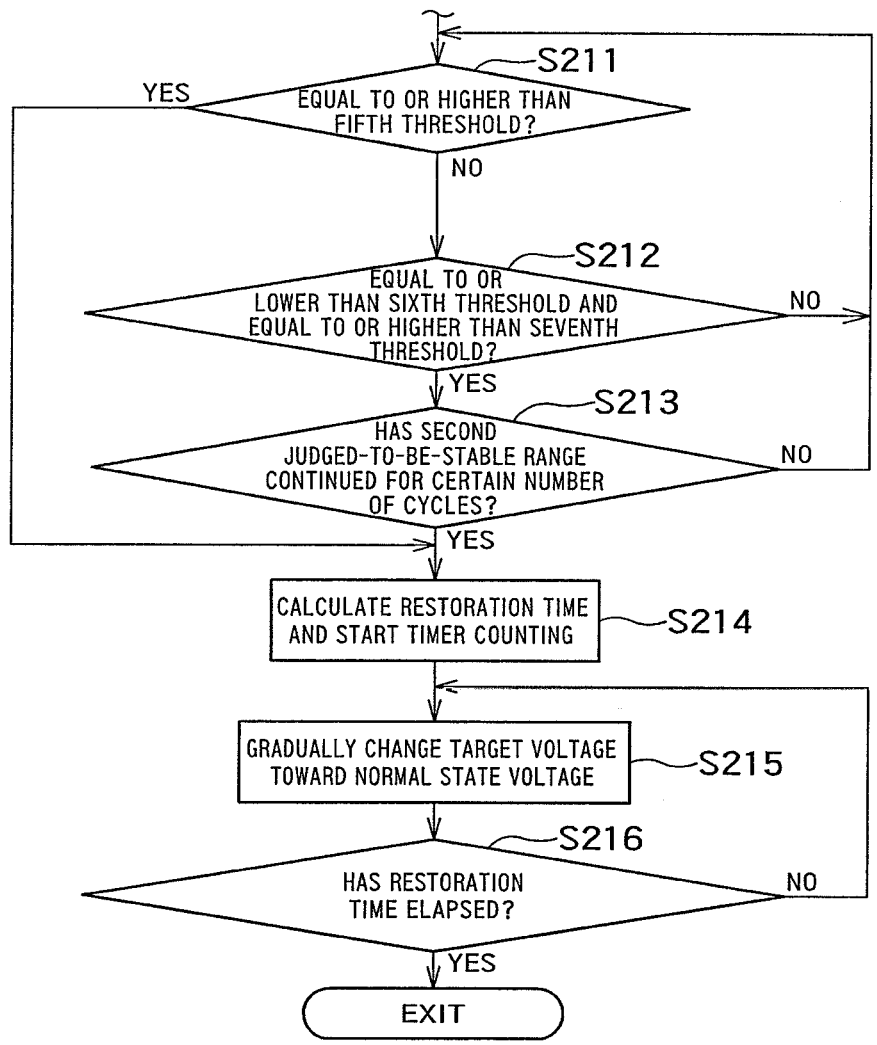

FIG. 6(A) is a diagram showing an example of a variation of the target voltage. FIG. 6(B) is a diagram showing an example of a variation of the peak value in each cycle. In FIG. 6(B), open circles are plots of the value of the peak of the inverse of the rotation number. FIG. 7 is a flowchart showing an example of the power generation controlling method according to the embodiment 2 performed by the drive controlling apparatus 100 shown in FIG. 1. In FIG. 7, the same reference numerals as those in FIG. 5 denote the same steps as those in FIG. 5. A stroke (1) in FIG. 6 corresponds to the first step S1 and the second step S2 in FIG. 7. A stroke (2) in FIG. 6 corresponds to the third step S3, the fourth step S4 and a fifth step S205 in FIG. 5. Strokes (3) and (3') in FIG. 6 correspond to a sixth step S206, a seventh step S207, an eighth step S208, a ninth step S209 and a tenth step S210 in FIG. 7. A stroke (4) in FIG. 6 corresponds to an eleventh step S211, a twelfth step S212 and a thirteenth step S213 in FIG. 7. A stroke (5) in FIG. 6 corresponds to a fourteenth step S214, a fifteenth step S215 and a sixteenth step S216 in FIG. 7.

As shown in FIG. 7, as in the first embodiment, the drive controlling apparatus 100 performs the first step S1, the second step S2, the third step S3 and the fourth step S4.

If the drive controlling apparatus 100 judges in the fourth step S4 that the first peak is equal to or higher than the third threshold TH3, the drive controlling apparatus 100 changes the target voltage from the normal state voltage to the in-acceleration voltage (the fifth step S205).

After changing the target voltage from the normal state voltage to the in-acceleration voltage, the drive controlling apparatus 100 starts counting of the acceleration determination period (the sixth step S206).

Then, the drive controlling apparatus 100 judges whether or not the second peak of the inverse of the rotation number measured in the second cycle following the first cycle is equal to or higher than the third threshold TH3 (the seventh step S207).

If the second peak is equal to or higher than the third threshold TH3, the drive controlling apparatus 100 judges whether or not the acceleration determination period has elapsed (the eighth step S208).

If the drive controlling apparatus 100 judges in the eighth step S208 that the acceleration determination period has not elapsed, the drive controlling apparatus 100 returns to the seventh step S207, in which the drive controlling apparatus 100 judges whether or not the second peak of the inverse of the rotation number measured in the next cycle is equal to or higher than the third threshold TH3.

On the other hand, if the drive controlling apparatus 100 judges in the eighth step S208 that the acceleration determination period has elapsed, the drive controlling apparatus 100 changes the target voltage from the in-acceleration voltage to the normal state voltage (the ninth step S209).

If the drive controlling apparatus 100 judges in the seventh step S207 described above that the second peak is not equal to or higher than the third threshold TH3, the drive controlling apparatus 100 judges whether or not the second peak is equal to or lower than the fourth threshold TH4 (the tenth step S210).

If the drive controlling apparatus 100 judges in the tenth step S210 that the second peak is not equal to or lower than the fourth threshold TH4, the drive controlling apparatus 100 returns to the seventh step S207, in which the drive controlling apparatus 100 judges whether or not the third peak of the inverse of the rotation number measured in the third cycle following the second cycle is equal to or higher than the third threshold TH3.

Then, after changing the target voltage from the normal state voltage to the in-acceleration voltage, the drive controlling apparatus 100 judges whether or not the third peak of the inverse of the rotation number measured in the third cycle following the second cycle is lower than the fifth threshold TH5 (the eleventh step S211).

If the third peak is not equal to or higher than the fifth threshold TH5 (acceleration is occurring), the drive controlling apparatus 100 judges whether or not the fourth peak of the inverse of the rotation number measured in the fourth cycle following the third cycle is equal to or lower than the sixth threshold TH6, which is lower than the fifth threshold TH5, and equal to or higher than the seventh threshold TH7, which is lower than the sixth threshold TH6 (that is, whether the fourth peak falls within the second judged-to-be-stable range A2) (the twelfth step S212).

If the drive controlling apparatus 100 judges in the twelfth step S212 that the fourth peak is not equal to or lower than the sixth threshold TH6 and equal to or higher than the seventh threshold TH7, the drive controlling apparatus 100 returns to the eleventh step S211, in which the drive controlling apparatus 100 judges whether or not the peak in a cycle following the fourth cycle (the next cycle following the fourth cycle, for example) is equal to or higher than the fifth threshold TH5. In this case, the peak in that following cycle is treated as the third peak described above.

On the other hand, if the fourth peak is equal to or lower than the sixth threshold TH6 and equal to or higher than the seventh threshold TH7, the drive controlling apparatus 100 judges whether or not each peak of the inverses of the rotation numbers measured in a plurality of successive cycles following the fourth cycle is equal to or lower than the sixth threshold TH6 and equal to or higher than the seventh threshold TH7 (that is, whether the peak falls within the second judged-to-be-stable range A2) (the thirteenth step S213).

If the drive controlling apparatus 100 judges in the thirteenth step S213 that each peak is not equal to or lower than the sixth threshold TH6 and equal to or higher than the seventh threshold TH7, the drive controlling apparatus 100 returns to the eleventh step S211, in which the drive controlling apparatus 100 judges whether or not the peak in a cycle following the plurality of successive cycles following the fourth cycle (the next cycle following the plurality of cycles, for example) is equal to or higher than the fifth threshold TH5. In this case, the peak in that following cycle is treated as the third peak described above.

When the drive controlling apparatus 100 judges in the thirteenth step S213 that each peak is equal to or lower than the sixth threshold TH6 and equal to or higher than the seventh threshold TH7, the drive controlling apparatus 100 starts counting of the restoration period (the fourteenth step S214).

It is to be noted that, if the drive controlling apparatus 100 judges in the eleventh step S211 described above that the third peak is equal to or higher than the fifth threshold TH5, the drive controlling apparatus 100 proceeds to the fourteenth step S214, in which the drive controlling apparatus 100 starts counting of the restoration period.

After starting counting of the restoration period in the fourteenth step S214, the drive controlling apparatus 100 gradually changes the target voltage from the in-acceleration voltage to the normal state voltage (the fifteenth step S215).

Then, the drive controlling apparatus 100 judges whether or not the restoration period has elapsed. If the restoration period has elapsed, the drive controlling apparatus 100 stops the change of the target voltage (the sixteenth step S216).

On the other hand, if the drive controlling apparatus 100 judges in the sixteenth step S216 that the restoration period has not elapsed, the drive controlling apparatus 100 returns to the fifteenth step S215, in which the drive controlling apparatus 100 gradually changes the target voltage toward the normal state voltage.

In the case where the target voltage is to be increased in this way, the engine 103 is trying to make the rotation number stable. Thus, if the load on the engine 103 abruptly increases, the rotation number may drop. Therefore, the target voltage is gradually restored to the normal state voltage, and upon completion of the restoration, the drive controlling apparatus 100 waits for the rotation number to be stable and performs monitoring again.

Through the steps described above, the operation of judging the acceleration state and changing the target voltage based on the information on the rotation number of the four-stroke engine without using the information on the operation of the throttle is completed.

That is, as with the power generation controlling method according to the embodiment 2, as in the embodiment 1, the power generation controlling method takes advantage of the phenomenon that, when the operation of the four-stroke engine changes to the acceleration state, the amount of the intake air of the four-stroke engine changes, and the rotation number decreases immediately before the acceleration starts. As a result, as in the embodiment 1, the acceleration state can be judged and the target voltage can be changed based on the information on the rotation number of the four-stroke engine without using the information on the operation of the throttle.

As described above, as in the embodiment 1, the power generation controlling method according to this embodiment can reduce the manufacturing cost of a motorcycle.

Although FIG. 1 shows the engine 103 and the motor 102 integrated with each other, the engine 103 and the motor 102 can be separate units.

The embodiments show cases where the motor 102 functions as both a electric motor and a generator.

However, even if the motor 102 is coupled to the crank shaft of the engine 103 so as to apply a torque thereto and functions only as a motor, the effects and advantages of the present invention can be achieved. In that case, another motor that functions as a generator is additionally provided.

It is to be noted that the drive controlling apparatus 100 can modify the first threshold TH1 and the second threshold TH2. The drive controlling apparatus 100 performs the power generation controlling methods described above using the set first threshold TH1 and second threshold TH2. Thus, for example, the first judged-to-be-stable range A1 can be set depending on the required operating conditions of the engine or the like.

It is to be noted that the drive controlling apparatus 100 can modify the sixth threshold TH6 and the seventh threshold TH7 depending on the required operating conditions of the engine. The drive controlling apparatus 100 performs the power generation controlling methods described above using the set sixth threshold TH6 and seventh threshold TH7. Thus, for example, the second judged-to-be-stable range A2 can be set depending on the required operating conditions of the engine or the like.

The embodiments described above are given for illustrative purposes, and the scope of the present invention is not limited thereto.

The invention claimed is:

1. A power generation controlling method of controlling a generator connected to a four-stroke engine based on a result of measurement of an inverse of a rotation number of the four-stroke engine, comprising:
   a first step of judging whether or not a peak of the inverse of the rotation number measured in a cycle of the four-stroke engine is equal to or lower than a first threshold and equal to or higher than a second threshold, the second threshold being lower than the first threshold;
   a second step of, in a case where the peak is equal to or lower than the first threshold and equal to or higher than the second threshold, judging whether or not each of peaks of the inverses of the rotation numbers measured in a plurality of successive cycles following the cycle is equal to or lower than the first threshold and equal to or higher than the second threshold;
   a third step of, in a case where it is judged in the second step that each of the peaks is equal to or lower than the first threshold and equal to or higher than the second threshold, judging whether or not a first peak of the inverse of the rotation number measured in a first cycle following the plurality of successive cycles is equal to or lower than the second threshold;
   a fourth step of, in a case where the first peak is not equal to or lower than the second threshold, judging whether or not the first peak is equal to or higher than a third threshold, the third threshold being higher than the first threshold;
   a fifth step of starting counting of an acceleration determination period after judging that the first peak is equal to or higher than the third threshold;
   a sixth step of judging whether or not the acceleration determination period has elapsed;
   a seventh step of, in a case where the acceleration determination period has not elapsed, judging whether or not a second peak of the inverse of the rotation number measured in a second cycle following the first cycle is equal to or lower than a fourth threshold, the fourth threshold being lower than the second threshold;
   an eighth step of, in a case where the second peak is equal to or lower than the fourth threshold, changing a target voltage of power generation by the generator, a rotating shaft of which is connected to a crank shaft of the four-stroke engine, from a normal state voltage to an in-acceleration voltage, the in-acceleration voltage being lower than the normal state voltage; and
   a ninth step of, in a case where the second peak is equal to or lower than the fourth threshold, designating the second peak as a fifth threshold.

2. The power generation controlling method according to claim 1, further comprising:
   a tenth step of, after changing the target voltage from the normal state voltage to the in-acceleration voltage, judging whether or not a third peak of the inverse of the rotation number measured in a third cycle following the second cycle is lower than the fifth threshold;
   an eleventh step of, in a case where the third peak is not equal to or higher than the fifth threshold, judging whether or not a fourth peak of the inverse of the rotation number measured in a fourth cycle following the third cycle is equal to or lower than a sixth threshold and equal to or higher than a seventh threshold, the sixth threshold being lower than the fifth threshold, and the seventh threshold being lower than the sixth threshold;
   a twelfth step of, in a case where the fourth peak is equal to or lower than the sixth threshold and equal to or higher than the seventh threshold, judging whether or not each of the peaks of the inverses of the rotation numbers measured in a plurality of successive cycles following the fourth cycle is equal to or lower than the sixth threshold and equal to or higher than the seventh threshold;
   a thirteenth step of starting counting of a restoration period after it is judged in the twelfth step that each of the peaks is equal to or lower than the sixth threshold and equal to or higher than the seventh threshold;
   a fourteenth step of gradually changing the target voltage from the in-acceleration voltage to the normal state voltage after starting counting of the restoration period; and
   a fifteenth step of judging whether or not the restoration period has elapsed and stopping the change of the target voltage in a case where the restoration period has elapsed.

3. The power generation controlling method according to claim 1, wherein in a case where it is judged in the first step that the peak is not equal to or lower than the first threshold and equal to or higher than the second threshold, it is judged whether or not a peak of the inverse of the rotation number measured in a next cycle is located between the first threshold and the second threshold.

4. The power generation controlling method according to claim 1, wherein in a case where it is judged in the second step that any of the peaks is not equal to or lower than the first threshold and equal to or higher than the second threshold, the method returns to the first step, and it is judged whether or not a peak of the inverse of the rotation number measured in a next cycle is located between the first threshold and the second threshold.

5. The power generation controlling method according to claim 1, wherein in a case where it is judged in the third step that the first peak is equal to or lower than the second threshold, the method returns to the first step, and it is judged whether or not a peak of the inverse of the rotation number measured in a next cycle is located between the first threshold and the second threshold.

6. The power generation controlling method according to claim 1, wherein in a case where it is judged in the fourth step that the first peak is not equal to or higher than the third threshold, the method returns to the third step.

7. The power generation controlling method according to claim 1, wherein in a case where it is judged in the sixth step that the acceleration determination period has elapsed, the method returns to the first step, the method returns to the first step, and it is judged whether or not a peak of the inverse of the rotation number measured in a next cycle is located between the first threshold and the second threshold.

8. The power generation controlling method according to claim 1, wherein in a case where it is judged in the seventh step that the second peak is not equal to or lower than the fourth threshold, the method returns to the sixth step, and it is judged again whether or not the acceleration determination period has elapsed.

9. The power generation controlling method according to claim 2, wherein in a case where it is judged in the tenth step that the third peak is equal to or higher than the fifth threshold, the method proceeds to the thirteenth step and starts counting of the restoration period.

10. The power generation controlling method according to claim 2, wherein in a case where it is judged in the eleventh step that the fourth peak is not equal to or lower than the sixth threshold and equal to or higher than the seventh threshold, the method returns to the tenth step, and it is judged whether or not a peak in a cycle following the fourth cycle is equal to or higher than the fifth threshold.

11. The power generation controlling method according to claim 2, wherein in a case where it is judged in the twelfth step that each of the peaks is not equal to or lower than the sixth threshold and equal to or higher than the seventh threshold, the method returns to the tenth step, and it is judged whether or not a peak in a cycle following the plurality of successive cycles following the fourth cycle is equal to or higher than the fifth threshold.

12. The power generation controlling method according to claim 2, wherein in a case where it is judged in the fifteenth step that the restoration period has not elapsed, the method returns to the fourteenth step, and the target voltage is gradually changed toward the normal state voltage.

13. A power generation controlling method of controlling a generator connected to a four-stroke engine based on a result of measurement of an inverse of a rotation number of the four-stroke engine, comprising:
- a first step of judging whether or not a peak of the inverse of the rotation number measured in a cycle of the four-stroke engine is equal to or lower than a first threshold and equal to or higher than a second threshold, the second threshold being lower than the first threshold;
- a second step of, in a case where the peak is equal to or lower than the first threshold and equal to or higher than the second threshold, judging whether or not each of peaks of the inverses of the rotation numbers measured in a plurality of successive cycles following the cycle is equal to or lower than the first threshold and equal to or higher than the second threshold;
- a third step of, in a case where it is judged in the second step that each of the peaks is equal to or lower than the first threshold and equal to or higher than the second threshold, judging whether or not a first peak of the inverse of the rotation number measured in a first cycle following the plurality of successive cycles is equal to or lower than the second threshold;
- a fourth step of, in a case where the first peak is not equal to or lower than the second threshold, judging whether or not the first peak is equal to or higher than a third threshold, the third threshold being higher than the first threshold; and
- a fifth step of, in a case where the first peak is equal to or higher than the third threshold, changing a target voltage of power generation by a motor, a rotating shaft of which is connected to a crank shaft of the four-stroke engine, from a normal state voltage to an in-acceleration voltage, the in-acceleration voltage being lower than the normal state voltage.

14. A drive controlling apparatus that controls driving of a four-stroke engine, performing:
- a first step of judging whether or not a peak of an inverse of a rotation number measured in a cycle of the four-stroke engine is equal to or lower than a first threshold and equal to or higher than a second threshold, the second threshold being lower than the first threshold;
- a second step of, in a case where the peak is equal to or lower than the first threshold and equal to or higher than the second threshold, judging whether or not each of peaks of the inverses of the rotation numbers measured in a plurality of successive cycles following the cycle is equal to or lower than the first threshold and equal to or higher than the second threshold;
- a third step of, in a case where it is judged in the second step that each of the peaks is equal to or lower than the first threshold and equal to or higher than the second threshold, judging whether or not a first peak of the inverse of the rotation number measured in a first cycle following the plurality of successive cycles is equal to or lower than the second threshold;
- a fourth step of, in a case where the first peak is not equal to or lower than the second threshold, judging whether or not the first peak is equal to or higher than a third threshold, the third threshold being higher than the first threshold;
- a fifth step of starting counting of an acceleration determination period after judging that the first peak is equal to or higher than the third threshold;
- a sixth step of judging whether or not the acceleration determination period has elapsed;
- a seventh step of, in a case where the acceleration determination period has not elapsed, judging whether or not a second peak of the inverse of the rotation number measured in a second cycle following the first cycle is equal to or lower than a fourth threshold, the fourth threshold being lower than the second threshold;
- an eighth step of, in a case where the second peak is equal to or lower than the fourth threshold, changing a target voltage of power generation by the generator, a rotating shaft of which is connected to a crank shaft of the four-stroke engine, from a normal state voltage to an in-acceleration voltage, the in-acceleration voltage being lower than the normal state voltage; and a ninth step of, in a case where the second peak is equal to or lower than the fourth threshold, designating the second peak as a fifth threshold.

15. The drive controlling apparatus according to claim 14, further performing:

a tenth step of, after changing the target voltage from the normal state voltage to the in-acceleration voltage, judging whether or not a third peak of the inverse of the rotation number measured in a third cycle following the second cycle is lower than the fifth threshold;

an eleventh step of, in a case where the third peak is not equal to or higher than the fifth threshold, judging whether or not a fourth peak of the inverse of the rotation number measured in a fourth cycle following the third cycle is equal to or lower than a sixth threshold and equal to or higher than a seventh threshold, the sixth threshold being lower than the fifth threshold, and the seventh threshold being lower than the sixth threshold;

a twelfth step of, in a case where the fourth peak is equal to or lower than the sixth threshold and equal to or higher than the seventh threshold, judging whether or not each of the peaks of the inverses of the rotation numbers measured in a plurality of successive cycles following the fourth cycle is equal to or lower than the sixth threshold and equal to or higher than the seventh threshold;

a thirteenth step of starting counting of a restoration period after it is judged in the twelfth step that each of the peaks is equal to or lower than the sixth threshold and equal to or higher than the seventh threshold;

a fourteenth step of gradually changing the target voltage from the in-acceleration voltage to the normal state voltage after starting counting of the restoration period; and a fifteenth step of judging whether or not the restoration period has elapsed and stopping the change of the target voltage in a case where the restoration period has elapsed.

\* \* \* \* \*